United States Patent
Sambuelli et al.

(10) Patent No.: US 6,366,537 B1
(45) Date of Patent: Apr. 2, 2002

(54) GEOPHONE AND METHOD FOR THE STUDY OF ELEASTIC WAVE PHENOMENA

(75) Inventors: Luigi Sambuelli, Torino; Gian Piero Deidda, Cagliari, both of (IT)

(73) Assignee: S.I.SV.EL., Societe Italiana per lo Sviluppo dell'Elettronica (IT)

( * ) Notice: Subject to any disclaimer, the term of this patent is extended or adjusted under 35 U.S.C. 154(b) by 0 days.

(21) Appl. No.: 09/600,218

(22) PCT Filed: Jan. 15, 1999

(86) PCT No.: PCT/IB99/00042

§ 371 Date: Nov. 20, 2000

§ 102(e) Date: Nov. 20, 2000

(87) PCT Pub. No.: WO99/36799

PCT Pub. Date: Jul. 22, 1999

(30) Foreign Application Priority Data

Jan. 16, 1998 (IT) .......................................... TO97A0030
Dec. 1, 1998 (IT) .......................................... TO98A1007

(51) Int. Cl.[7] .................................................. G01V 1/16
(52) U.S. Cl. .......................... 367/178; 367/75; 367/188; 181/401
(58) Field of Search ................. 367/178, 188, 367/75; 73/594; 181/401

(56) References Cited

U.S. PATENT DOCUMENTS 4,300,220 A * 11/1981 Goff et al. ................. 367/188
4,813,029 A * 3/1989 Erich, Jr. et al. ........... 367/188

FOREIGN PATENT DOCUMENTS

DE 19528480 A * 2/1997

OTHER PUBLICATIONS

Lawton et al., "Azimuthal responses of some three component geophones" The leading Edge, vol. 12, #11, Nov. 1993.*

* cited by examiner

Primary Examiner—Ian J. Lobo
(74) Attorney, Agent, or Firm—Levine & Mandelbaum

(57) ABSTRACT

A method for the study of elastic wave phenomena in the ground, where the detection of said phenomena is carried out with the use of at least a geophone comprising at least a couple of transducers (20, 21; 37, 38), each transducer (20, 21; 37, 38) being apt to detect horizontally polarized shear waves, represented by SH signals, and compression waves, represented by P signals. The method comprises: i) a first detection, by means of one of said transducers (20, 21; 37, 38) of the sum of said P and PH signals (P+SH); ii) a second detection, by means of the other one of said transducer (20, 21; 37, 38) of the difference between said P and SH signals ([P−SH] or [−P+SH]); iii) the compensation ([P+SH]−[P−SH]) or [P+SH]+[P−SH]) between said first and said second detection, in order to acquire signals being representative of horizontally polarized shear waves with an increased sensitivity and being less affected by the presence of compression waves.

15 Claims, 7 Drawing Sheets

GEOPHONE AND METHOD FOR THE STUDY OF ELEASTIC WAVE PHENOMENA

DESCRIPTION

The present invention refers to a geophone and a method for the study of elastic wave phenomena in the ground.

With the aim of studying the lower layers of the terrestrial surface a seismic signal is usually generated and transmitted in the Earth, from one or more sources adjacent to or placed on the terrestrial surface, and have a geophone, i.e. a mechanical-electrical transducer of elastic waves, receive the consequent energy being reflected and/or refracted from the inside of the Earth.

In view of this kind of studies, a certain number of geophones is placed over the ground according to known schemes, to acquire and store all the various information collected through them, usually through an apparatus called seismograph, so as to obtain an indication about the layers underlying the terrestrial ground.

Geophones for the detection of seismic signals generally comprise electromagnetic devices comprising at least a coil, representing the electric circuit, and at least a magnet interacting with the coil. One of these two elements, i.e. either the coil or the magnet, is rigidly connected with the geophone structure, whereas the other one is flexibly suspended to the structure itself In response to the Earth movement generated by the seismic signal transmitted into it for study purposes, all fixed elements of the geophone move integrally with said structure; also the suspended element will tend to move under the effect of the inertial force, but with a delay in respect to the non suspended element, thus generating a relative motion between the two, i.e. between the magnet and the coil.

This relative motion will induce an electric current to the coil, said current forming the geophone output signal.

Geophones according to the type mentioned above are used to detect various kinds of seismic signals generated during exploration of terrestrial layers.

The most common signal is represented by the so-called compression waves, or lengthwise waves, or type P waves, with propagation occurring through alternate rarefactions and compressions in the material; thus, the motion of the infinite planes into which the rocky body can be ideally broken up, occurs to and thro (backwards and forwards) in the wave propagation direction.

The second type of waves is represented by the shear waves or S waves, where the motion of the rock particles is perpendicular to the direction of the wave propagation.

Shear waves whose particles motion is oriented perpendicularly to the propagation direction and on a horizontal plane are called horizontal shear waves or SH waves, whereas shear waves whose particles motion is oriented perpendicularly to the propagation direction and on a vertical plane are called vertical shear waves or SV waves.

Compression waves P are the signals most commonly used to explore the underground and may be generated in different ways, such as the blasting of an explosive, the falling of weights or the use of apparatus generating elastic pulses or trains of elastic pulses in the ground during a procedure called energization. In the course of the data acquisition campaigns it is also normal practice for the detection operator to strike the ground with special hammers to generate compression waves P.

At present several types of geophones are available on the market, namely:
- horizontal geophones to study S waves, provided with two output terminals;
- vertical geophones to study P waves, also with two output terminals;
- biphone geophones to study for example surface waves with elliptic polarization R, having four output terminals;
- three-axis geophones to study P, SH and SV waves, with six output terminals.

From U.S. Pat. No. 4,813,029 is also known an apparatus capable of detecting both the compression waves P and the horizontal shear waves SH, as well as an exploring method using such an apparatus.

The apparatus described in the U.S. Pat. No. 4,813,029 has a first and second geophones assembled on a common carrying plate, where the axis of the geophones are inclined to opposite directions at an angle of about 45° from the vertical.

In the preferred embodiment of this apparatus, the axis of the geophones are located on the same vertical plane, which is substantially perpendicular to a line extending from the seismic source to the apparatus, or on parallel vertical planes.

Each geophone of said apparatus detects both the compression waves P and the shear waves SH transmitted to the carrying plate, and each geophone generates an output signal proportional to the seismic energy detected by it.

In a second phase, the two single output signals from the two geophones are either summed up to give a compression wave track and/or subtracted to give a shear wave track.

Thus, according to the present daily practice, the man skilled in the art is never able to obtain a pure shear waves track, i.e. not contaminated by compression waves, on the output of the geophones, in spite of the number of geophones available on the ground according to optimized schemes.

Moreover, in the best of instances three-axis geophones have to be used, and therefore the apparatus apt to store the output signals from the geophones, i.e. the seismograph, receives detections of waves of the P, SH e SV type in an alternate way, so that the seismograph channels are all engaged after the execution of a relatively limited number of detections. According to the present state of art, another drawback associated with the use of the geophones already known is that of requiring an energization first in one direction and then in the opposite direction (i.e. near the two opposite sides of the device), in order to obtain waves of equal intensity but of opposite direction, and to carry out the waves either summed up or subtracted according to the kind of wave being required, as previously described.

This procedure not only increases detection times, but does not warrant an absolute equality of the signal generated by the source, as in most instances it is a manual energization (i.e. obtained with the hammers mentioned above), whose intensity and trend cannot be reproduced exactly with time.

Another drawback according to the prior art is that the output signal has to be sent to proper signal process circuits, thus extending the time required for data processing.

Also, another drawback is that the signals from both the terminals of a geophone have to be stored, thus occupying memory space in the seismograph.

The present invention has the purpose of solving the above drawbacks and provide geophone and a method for the study of elastic wave phenomena in the ground which are improved and more efficient with respect to the solutions already known and with an increased sensitivity to horizontally polarized shear waves.

Within this frame, it is a first aim of the present invention to provide a geophone and/or a method for the study of elastic wave phenomena in the ground, having an increased sensitivity to horizontally polarized shear waves SH, which allows acquisition of data that are less affected by the presence of P waves with respect to the known techniques, and which reduces the data acquisition operations.

A second aim of the present invention is to provide a geophone and/or a method for the study of elastic wave phenomena in the ground, which allows to reduce the time required for the data acquisition campaign, requesting only one energization for each measurement instead of two as presently needed according to the known state of art.

A third aim of the present invention is to provide a geophone and/or a method for the study of elastic wave phenomena in the ground, which allows to reduce the time required to process the output signal, assigning to the special type of assembly of the transducers the task of enhancement of a component along one direction and the attenuation of another component to a different direction orthogonal to the first one.

A fourth aim of the present invention is to optimize the use of the memory of a seismograph associated with the geophone according to the invention, for, on one hand, avoiding a storage of signals from both the terminals of the apparatus and, on the other hand, allowing to use all the memory of the seismograph exclusively for the horizontally polarized shear waves SH.

In order to reach the above aims, the object of the present invention are a geophone and a method for the study of elastic wave phenomena in the ground, incorporating the features of the annexed claims, which form an integral part of this description.

Further aims, features and advantages of the present invention will become clear from the following detailed description and the attached drawings, which are only supplied by way of a non limiting example, wherein.

Figure 1:
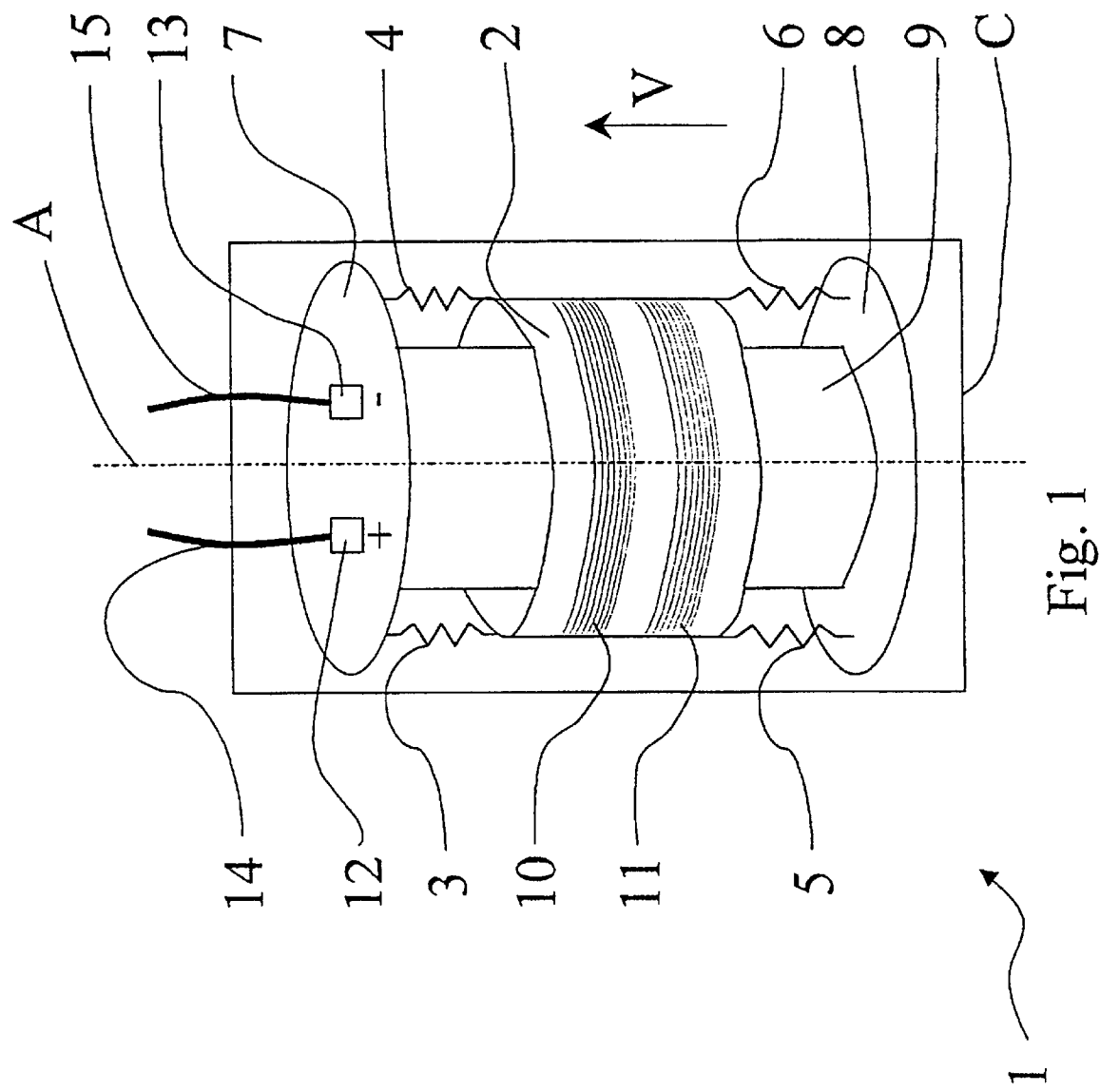
FIG. 1 shows an isometric view of a mechanical-electrical elastic waves transducer according to the known state of art.

With reference to FIG. 1, a general diagram of a known geophone is shown, using a mechanical-electrical transducer of elastic wave phenomena.

Such a geophone, indicated with 1 as a whole, comprises a substantially box-like external housing, indicated with C.

The housing C may have a pile shoe integral with it, not shown, which is apt to be driven into the ground under test.

Within the housing C a lower supporting base 8 is mounted, integral with the lower end of a magnet 9 having a substantially cylindrical shape; on the magnet upper end 9 a top header 7 is mounted integral with it.

Number 2 indicates a suspended body consisting in the specific case of a ring element surrounding at least a part of the magnet 9; loop rings indicated schematically with 10 and 11 are wound on said suspended body 2.

The suspended body or coil 2 is connected by proper elastic means, such as springs, with the lower supporting base 8 and the top header 7; specifically, numbers 3 and 4 indicate the connecting elastic means of the suspended body 2 with the top header 7, whereas numbers 5 and 6 indicate the connecting elastic means of the suspended body 2 with the lower supporting base 8.

Numbers 12 and 13 indicate a positive pole and a negative pole connected with the top header 7 respectively; numbers 14 and 15 indicate electric connection means, such as output cables, departing from poles 12 and 13, respectively.

Operation of the known geophone 1 shown in FIG. 1 is as follows.

The geophone 1 is driven into the ground to be tested through the above mentioned pile shoe.

In response to an Earth movement determined as described initially in this description, all "fixed" elements of the geophone 1, i.e. base 8, header 7 and magnet 9 move integrally with the housing C; also the suspended body 2 tends to move, but is delayed with respect to said fixed elements of the geophone I due to the effect of the inertia force.

Thus, a relative motion is determined between the magnet 9 and the loop rings 10 and 11, carried by the suspended body 2. This motion induces an electric current in the loop rings 10 and 11, which constitutes the output signal of the geophone 1, detectable through cables 14 and 15, respectively on the terminals of the positive pole 12 and negative pole 13.

Interpretation of the signals generated by the geophone 1, obtained in the practice through a seismograph connected with cables 14 and 15, can be briefly described by way of example as follows. To this purpose, in the following, the axis A of the geophone 1 will mean the straight line going through the geometric center of the geophone 1 shown in FIG. 1 parallel to the vertical walls of its housing C.

If a vector V associated with the vertical axis A of the geophone 1 is defined, an oscillation of conventionally positive sign appearing first on the tail of said vector V, i.e. first on the lower side of the geophone 1, is transduced into a positive oscillation of the differential voltage exiting between the positive pole 12 and the negative pole 13, according to the module of said vector V. If, on the contrary, a positive oscillation appears first on the tip of said vector V, it is transduced into a negative oscillation of the output voltage between the positive pole 12 and the negative pole 13, according to the module of said vector V.

These data are recorded by the seismograph, to which a plurality of geophones 1 is connected; following a proper elaboration, they will provide indications concerning the morphology of the ground underlying layers.

Figure 2:
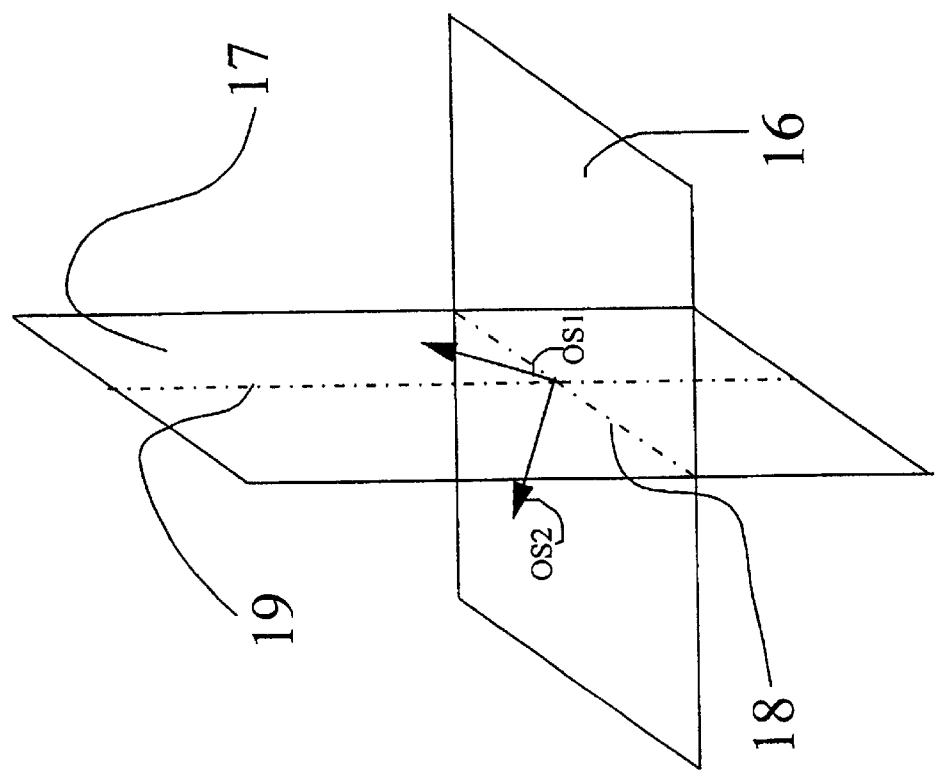
FIG. 2 shows a particular planes and straight lines arrangement in the space, for a clear understanding of the present invention.

FIG. 2 shows a special arrangement of geometric planes and straight lines in the space, which is of help for a clearer and simpler understanding of the present invention, as illustrated in the following FIG. 3 it has to be correlated with.

According with the arrangement of FIG. 2, planes 16 and 17 are defined orthogonal to each other; in their turn, they define a straight line 18 intersecting with planes 16 and 17; moreover, also a straight line 19 is defined, which is orthogonal to the straight line 18 and laying on the plane 17.

Figure 3:
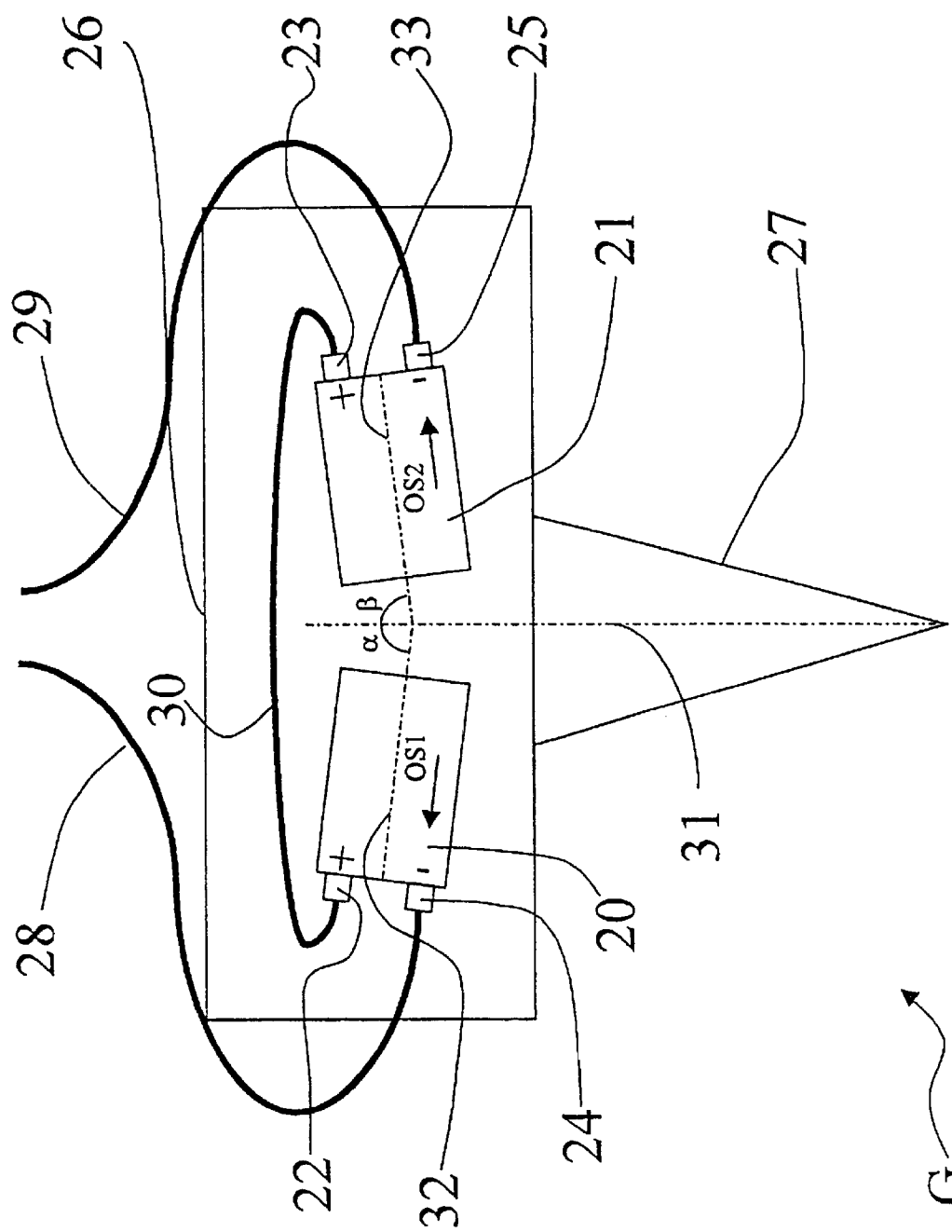
FIG. 3 shows a general diagram of a geophone with increased sensitivity to horizontally polarized shear waves according to the present invention.

FIG. 3 shows a general diagram of a geophone according to the present invention, wherein the plane of the sheet represented in FIG. 3 corresponds to the plane 17 of FIG. 2.

Said geophone, indicated as a whole with G, comprises a housing 26 for two mechanical-electrical transducers carrying out the function of elastic waves transducers, indicated with 20 and 21. Number 27 indicates a pile shoe, through which the geophone G is associated with the ground.

In the example described above, it can be assumed that transducers 20 and 21 consist themselves of geophones manufactured according to the known technique described with reference to FIG. 1; it is obvious, in this instance, that geophones 20 and 21 do not require their relevant pile shoes.

Both transducers 20 and 21 are steadily fastened to the housing 26, so that vectors OS1 and OS2, being respectively associated with the vertical axis 32 and 33 of transducers 20 21, lay on one same plane, i.e. the plane 17 of FIG. 2.

Moreover, the two transducers 20 and 21 are so arranged that vectors OS1 and OS2 are symmetric in direction and sense with respect to an axis 31, corresponding with the line 19 of FIG. 2, have the same amplitude or module, and form with respect to said axis 31 equal angles α and β ranging from 60 to 120 degrees. Specifically, in a preferred embodiment of the geophone G according to the invention, angles α and β are worth about 87 degrees.

Transducers 20 and 21 have positive poles or terminals 22 and 23 and negative poles or terminals 24 and 25, respectively. Positive poles 22 and 23 of transducers 20 and 21 are connected to each other through electric connection means 30, such as an electric cable, whereas the signal of the negative poles 24 and 25 of transducers is brought outside the geophone G through output cables 28 and 29.

As it can be noted, according to the invention, the two transducers 20 and 21 are electrically connected to have the two polarities of equal sign connected to each other, and the other two polarities forming the output signal. As it will become more obvious later, this allows for obtaining significant benefits in terms of purity for the output signal.

Assuming that to the module of the vector OS1 can be associated the frequency response of the transducer 20 and that to the module of the vector OS2 can be associated the frequency response of the transducer 21, care shall be taken that the housing 26 does not generate resonance peaks in the useful frequency band; moreover, the frequency responses in the useful band, the natural or resonance frequencies, the bodies, so far as possible the spurious impedances, and the complex impedances on the useful band shall be the same to a maximum extent for both transducers 20 and 21 electrically connected in one same geophone G.

Therefore, in short, the expert of the art shall take care that, based on procedures known as such, both transducers 20 and 21 have a substantially similar mechanical-electrical behaviour.

The geophone G according to the invention is suitable to provide the track related to the horizontally polarized shear waves SH, not contaminated by P type waves; this because through the above arrangement of transducers 20 and 21 the geophone G is apt to attenuate the component of a wave phenomenon along the straight line 19, and enhance the one along the straight line 18 of FIG. 2.

Specifically, operation of the geophone G according to this invention is as follows.

For the practical use, the geophone G is driven into the ground by its pile shoe 27 and the output cables 28 and 29 are directly connected with a multipole cable not represented in FIG. 3 for simplicity's sake, which is connected with a seismograph of a known type.

Then, the operator determines a movement in the Earth, also according to known procedures (reference can be made for instance to the beginning of this description).

As mentioned, the electric signal related to the track of the horizontally polarized shear waves SH will be obtained on output cables 28 and 29, not contaminated by the P type waves.

In fact, due to the specific electric connection of the two transducers 20 and 21 (two polarities with equal sign connected to each other and the other two polarities forming the geophone output signal), a signal is automatically generated on output cables 28 and 29

$$(P+SH)-(P-SH)=2SH$$

(where P and SH indicate the types of waves described at the beginning of this description), which forms the track related to the horizontally polarized shear waves SH, not contaminated by type P waves.

In the practice, due to the specific arrangement of both transducers in the space, the P waves they receive is substantially the same; for the SH wave is different, as in one transducer it appears first on the tail of the vector associated with it, whereas in the other transducer it appears first on the tip of the vector associated with it.

As previously described, an oscillation appearing first on the vector tail will be transduced into a positive oscillation, whereas an oscillation appearing first on the vector tip will be transduced into a negative oscillation.

Consequently, one transducer will transduce the SH wave with a positive sign, and the other transducer with a negative sign. The difference between both signals (P+SH) and (P−SH) received is generated by the special anti-series connection of the two transducers.

In this way, a signal not affected by the presence of P waves is obtained, whose amplitude is substantially twice the one that would be obtained with a single transducer.

The characteristics of the present invention are apparent from the above description, as well as its advantages are clear.

Specifically, a geophone has been described, which is apt for the study of wave elastic phenomena of the type having an increased sensitivity to horizontally polarized shear waves; the device according to the invention allows to get a track of horizontally polarized shear waves not contaminated by compression waves, also reducing both the time and costs for the data acquisition campaign.

According to the above description also a new method has become apparent, for detecting elastic wave phenomena in the seismic field, using at least a geophone having at least a couple of transducers, each transducer being apt to detect horizontally polarized shear waves represented by signals SH and compression waves represented by signals P.

The method provides at least the association of the geophone with the ground, an energization operation and the subsequent detection through the geophone of reflected and/or refracted waves generated by said energization, from the underlying ground layers.

The method according to the invention comprises the following characterizing steps:

iv) a first detection, through one of said transducers, of the sum of said signals P and SH (P+SH);

v) a second detection, through the other transducer, of the difference between said signals P and SH (P−SH), vi) the compensation ((P+SH)−(P−SH)) between said first and second detection of the influence of the P compression waves.

It should be noted that the above steps are obtained simultaneously and automatically through the special electric polarity connection of the transducers applied.

The geophone and the method according to the invention offer the advantage of avoiding a double energizing operation, i.e. the production of elastic pulses or trains of elastic pulses in the ground under test. This ensures a higher measuring precision with respect to the present state of the art and a considerable time saving.

Moreover, the invention has the advantage of not requiring additional calculations, such as a summing up or subtraction of digital signals to elaborate the signal received, since the special connection between the transducers will return a directly usable signal, thus reducing both the costs and signal processing time.

Another advantage of the invention is represented by a smaller memory occupation in the seismograph receiving the output signals from the geophone according to the invention, as it is no longer required to enter the data following a double energization, whereby the seismograph memory can conveniently make use of the seismograph memory for further detections.

Moreover, the invention also has the advantage of obtaining horizontally polarized shear waves SH whose amplitude is approximately twice the one that would be obtained with one transducer alone aligned with the motion direction of the particles of the seismic wave component to be acquired, so increasing sensitivity.

It is obvious that many changes are possible for the man skilled in the art to the geophone and the method for the study of elastic wave phenomena in the ground with increased sensitivity to horizontally polarized shear waves, described by way of example, without departing from the novelty spirit of the innovative solution; it is also clear that in the practical actuation of the invention the components may differ in form and size from the ones described and be replaced with technical equivalent elements.

For instance, in the example described with reference to FIG. 3, the two transducers 20 and 21 are electrically connected so that the two positive sign polarities are connected to each other, the two negative polarities forming the two terminals for the output signal.

In any case, it is clear for the skilled man that the invention may also be implemented through the mutual connection of the two polarities with the negative sign, while in this instance the two positive polarities will form the terminals for the output signal.

It should also be noticed that the arrangement of the transducers 20 and 21 may differ, if necessary, from the one described with reference to FIG. 3, but without changing the mutual connection of the two polarities with the same sign, the other two polarities forming the geophone output signal.

Figure 4:
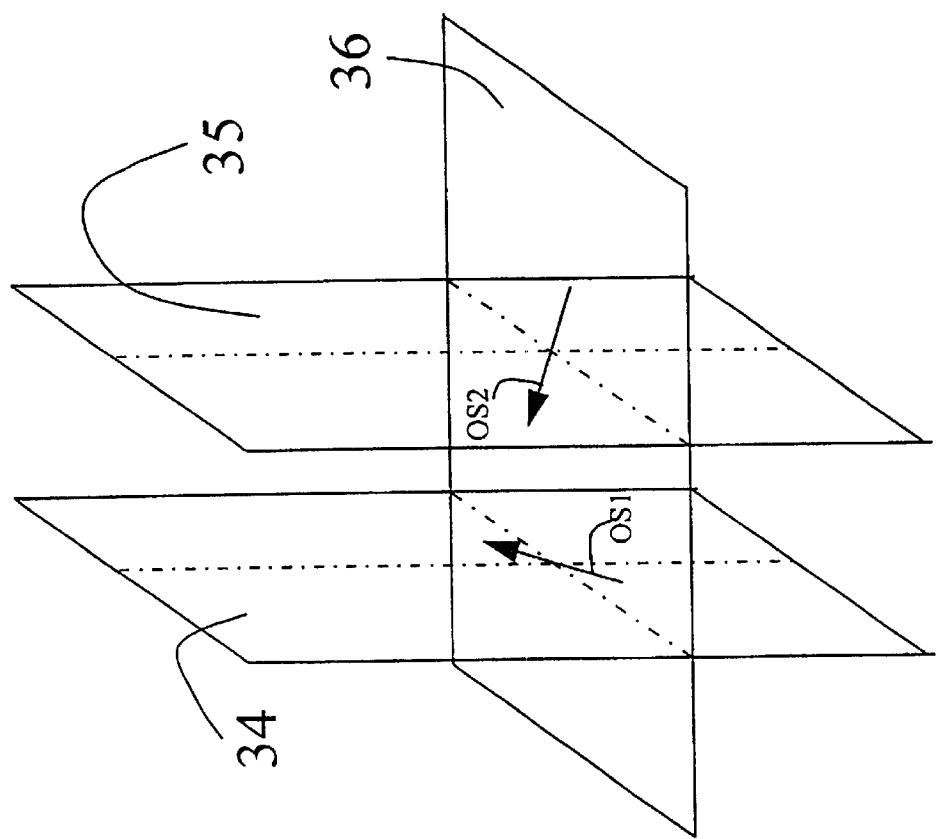
FIG. 4 shows a second particular geometric planes arrangement in the space, for a clear understanding of a first possible variant of the present invention.

To this purpose, FIG. 4 shows another arrangement of geometric planes in the space, for a better understanding of a possible variant embodiment of the present invention; in such a figure, 34 and 35 indicates planes being parallel to each other and orthogonal to a plane 36. According to the suggested variant, the geophone according to the invention may be built assembling both transducers 20 and 21 with vectors OS1 and OS2 laying on planes 34 and 35, parallel to each other and orthogonal to the plane 36, so that the vector OS1 belongs to the plane 34 and the vector OS2 to the plane 35.

According to this embodiment, the two vectors OS1 and OS2 should also be so arranged so that vectors OS1 and OS2 are symmetric with respect to a plane orthogonal to planes 34, 35 e 36 and, laying on planes 34 and 35, form with such a plane equal angles from 60 to 120 degrees.

Figure 5:
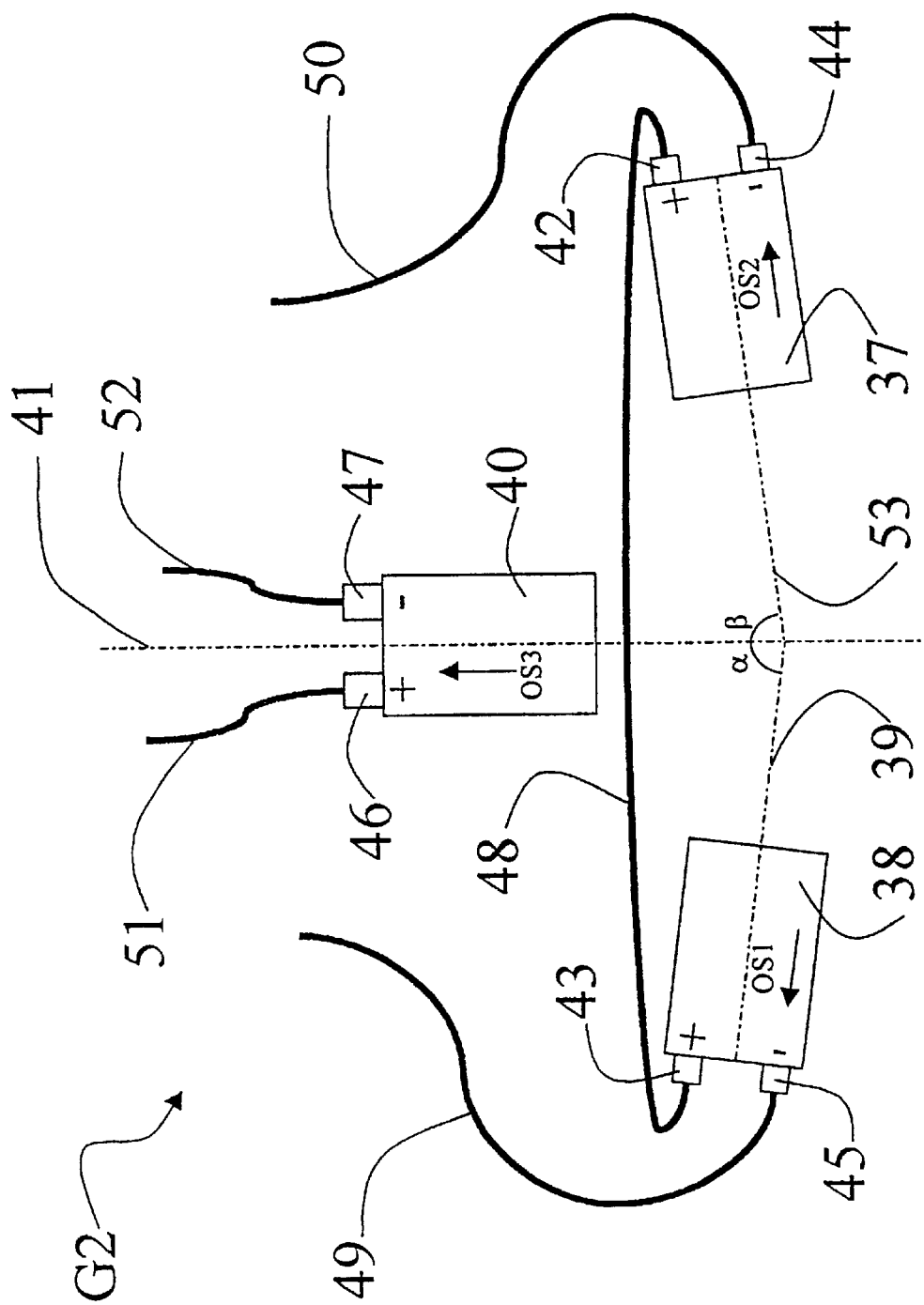
FIG. 5 shows a general diagram of a second possible variant of the present invention.

FIG. 5 shows another possible embodiment of the invention. In this figure the outside housing of the geophone according to the invention and its relevant pile shoe are not represented for simplicity's sake.

In this figure, G2 indicates a geophone consisting of a couple of transducers 37 and 38, and a vertical transducer 40 placed, with an associated vector OS3, parallel to a straight line 41, which is the symmetry vertical axis of the couple of transducers 37 and 38.

Axis 39, 53 and 41 pertaining to transducers 38, 37 and 40 lay on one same plane.

Also in this case, transducers 37, 38 and 40 may consist themselves of geophones made according to the known technique described with reference to FIG. 1.

Transducers 37, 38 and 40 are provided with positive poles indicated with 42, 43 and 46, respectively, and negative poles, indicated with 44, 45 and 47, respectively.

Also in agreement with this embodiment, the positive poles or terminals 42 e 43 of transducers 37 and 38 are connected to each other, through electric connecting means 48, and the output signals on the end of the negative poles or terminals 44 and 45 of transducers 38 and 37 are brought outside the geophone G2 through output cables 49 and 50; similarly, the signals of transducers 40 are also brought outside the geophone G2 through output cables 51 and 52.

In this case, therefore, the output cables are four: two cables 49 and 50 deriving from the couple of transducers 38 and 37 and the other couple of cables 51 and 52 deriving from the transducer 40.

As it can be seen, if transducers 37, 38 and 40 are elastic waves transducers, this assembly allows the receipt of separate clean information of SH waves and P waves with just one energization.

It is also clear to the skilled man that the geophone G2 may be built by assembling the transducers 38 and 37 for having their associated vectors OS1 and OS2 laying on planes 34 and 35 of FIG. 4, parallel to each other and orthogonal to the plane 36 of FIG. 4, so that the vector OS1 belongs to the plane 34 of FIG. 4 and the vector OS2 to the plane 35 of FIG. 4. Moreover, according to this variant, both transducers 38 and 37 should be so arranged to have vectors OS1 and OS2 symmetric with respect to a plane orthogonal to the planes 34, 35 and 36 of FIG. 4.

It should also be noticed that the same result of elimination of the signal pertaining to the P waves and of doubling of the signal pertaining to the SH waves, as above described, can be reached also by reversing the sense of one of the vector OS1 or OS2 associated with the transducer 20, 38 e 21, 37, so obtaining a so-called equi-sense arrangement, and by am electrical connection in series between the transducers 20 and 21 or 37 and 38.

In this way a geophone is obtained, where the P waves, due to the spatial arrangement of vectors OS1 and OS2 associated with the transducers 20, 38 and 21, 37, are acquired with an opposite polarity by the transducers 20, 38 and 21, 37 and removed in the electrical signal resulting from the sum produced by the connection in series of the electric polarity of said transducers 20, 38 and 21, 37.

The SH waves, on the other end, due to the spatial arrangement of vectors OS1 and OS2 associated with the transducers 20, 38 and 21, 37, are acquired with a same polarity by the transducers 20, 38 and 21, 37 and summed up in the electrical signal resulting from the sum produced by the connection in series of the electric polarity of said transducers 20, 38 and 21, 37.

Consequently, according the same symbology already used, in the case of an equi-sense arrangement of vectors OS1 and OS2 associated with transducers 20, 38 and 21, 37 and of a connection in series of the electric polarity of said transducers 20, 38 and 21, 37, will be obtained:

$$(P+SH)+(-P+SH)=2SH$$

Figure 6:
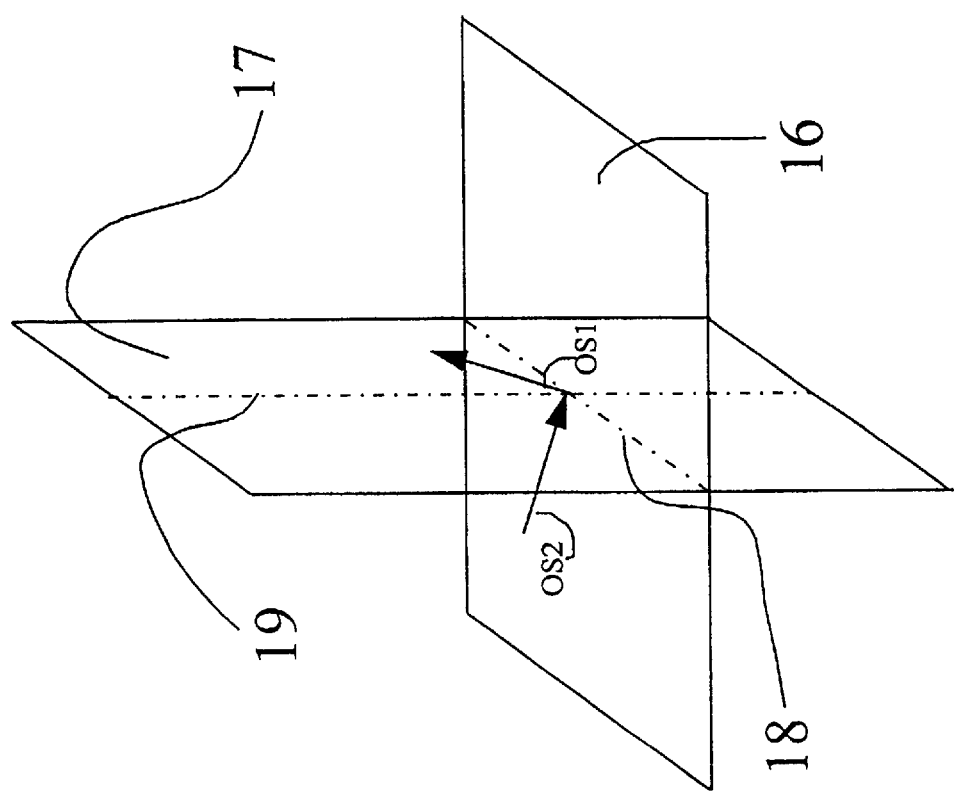
FIG. 6 shows a third particular geometric planes arrangement in the space, for a clear understanding of a third possible variant of the present invention.

For a better understanding of the above, in FIGS. 6–9 further variants of the present invention are indicated; said figures use the same reference numbers of the previous figures, for indicating technically equivalent components, FIG. 6 shows a special arrangement of geometric planes and straight lines in the space, which is of help for a clearer and simpler understanding of a further variant of the present invention, as illustrated in the following FIG. 7 it has to be correlated with.

According with the arrangement of FIG. 6, planes 16 and 17 are defined orthogonal to each other; in their turn, they define a straight line 18 intersecting with planes 16 and 17; moreover, also a straight line 19 is defined, which is orthogonal to the straight line 18 and laying on the plane 17.

Figure 7:
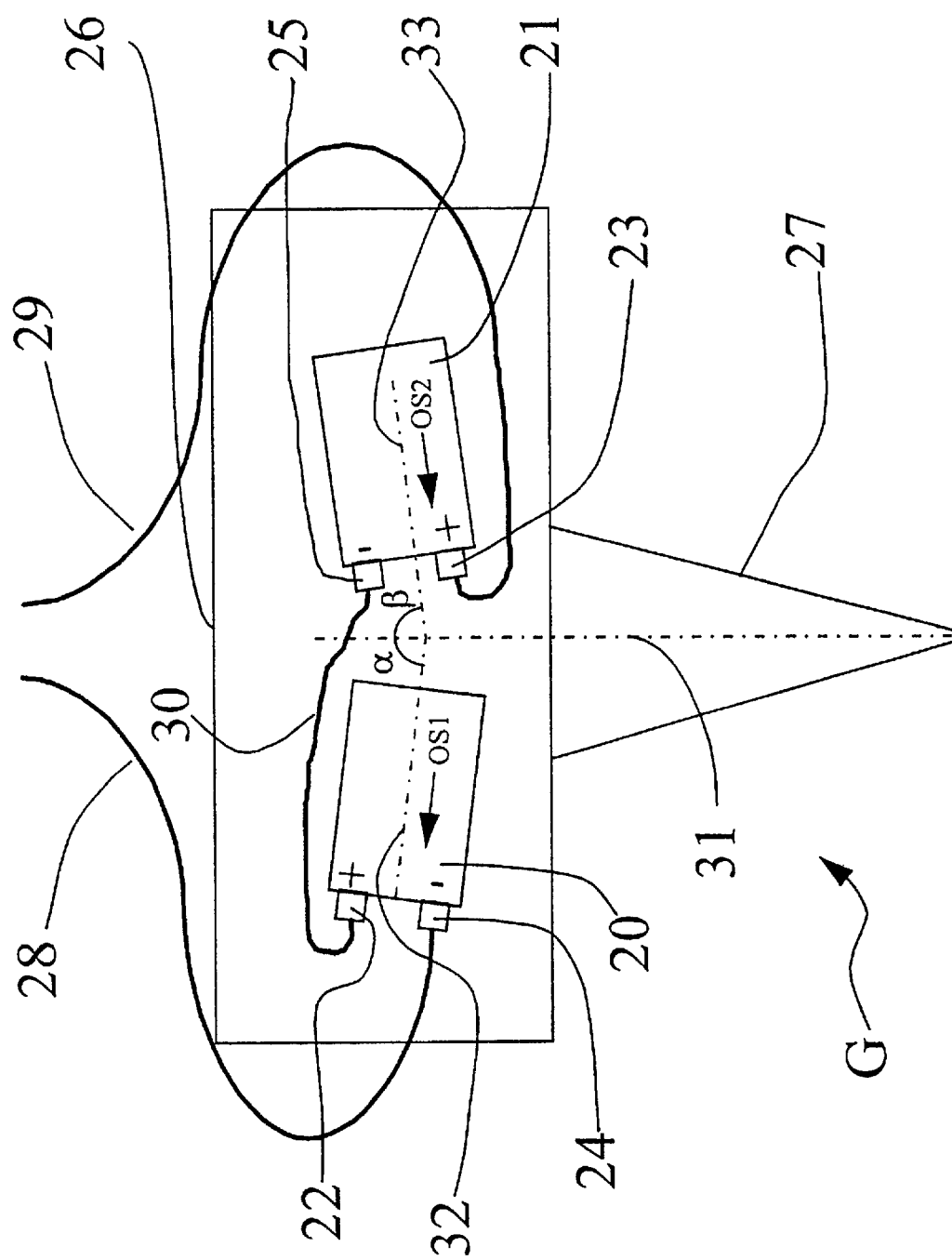
FIG. 7 shows a general diagram of a third possible variant of the present invention.

FIG. 7 shows a general diagram of a geophone according to the variant of the present invention, wherein the plane of the sheet represented in FIG. 7 corresponds to the plane 17 of FIG. 6.

Said geophone, indicated as a whole with G, comprises a housing 26 for two mechanical-electrical transducers carrying out the function of elastic waves transducers, indicated with 20 and 21. Number 27 indicates a pile shoe, through which the geophone G is associated with the ground. Also in this example, it can be assumed that transducers 20 and 21 consist themselves of geophones manufactured according to the known technique described with reference to FIG. 1. Both transducers 20 and 21 are steadily fastened to the housing 26, so that vectors OS1 and OS2, being respectively associated with the vertical axis 32 and 33 of transducers 20 21, lay on one same plane, i.e. the plane 17 of FIG. 6.

Moreover, the two transducers 20 and 21 are so arranged that vectors OS1 and OS2 are symmetric with respect to an axis 31, corresponding with the line 19 of FIG. 2, have the same sense (equi-sense arrangement) and amplitude or module, and form with respect to said axis 31 equal angles α and β ranging from 60 to 120 degrees. In the preferred embodiment of the geophone G according to the proposed variant, angles α and β are worth about 87 degrees.

Transducers 20 and 21 have positive poles or terminals 22 and 23 and negative poles or terminals 24 and 25, respectively. The positive pole 22 of the transducer 20 is connected to the negative pole 25 of the transducer 21 through electric connection means 30, such as an electric cable, whereas the signals of the negative poles 24 of the transducer 20 and the positive pole of the transducer 21 are brought outside the geophone G through output cables 28 and 29. As it can be noted, according to the proposed variant, the two transducers 20 and 21 are electrically connected in series. Also in this case, as already mentioned, the expert of the art shall take care that, based on procedures known as such, both transducers 20 and 21 have a substantially similar mechanical-electrical behaviour.

Also the geophone G according to the variant embodiment of FIG. 7 is suitable to provide the track related to the horizontally polarized shear waves SH not contaminated by P type waves; this because through the above arrangement of transducers 20 and 21 and their electric connection, the geophone G is apt to attenuate the component of a wave phenomenon along the straight line 19, and enhance the one along the straight line 18 of FIG. 6.

The use of the geophone G of FIG. 7 is the same as the geophone of FIG. 3, and the electric signal related to the track of the horizontally polarized shear waves SH will be obtained on output cables 28 and 29, not contaminated by the P type waves.

In fact, due to the electric connection in series of the two transducers 20 and 21 and the equi-sense arrangement of vectors OS1 and OS2, a signal is automatically generated on output cables 28 and 29

$$(P+SH)+(-P+SH)=2SH$$

(where P and SH indicate the types of waves described at the beginning of this description), which forms the track related to the horizontally polarized shear waves SH, not contaminated by type P waves.

As already mentioned, in the practice, due to the spatial arrangement of the vectors OS1 and OS2, the P waves are acquired with opposite polarity by the transducers 20 and 21, and eliminated in the electric signal resulting from the sum produced by the connection in series of the electric polarities of said transducers 20 and 21. For the same reason, the SH waves are instead acquired with the same polarity by the transducers 20 and 21 and summed up in the electric signal resulting from the sum produced by the connection in series of the electric polarities of said transducers 20 and 21

In fact, due to the particular spatial arrangement of the transducers, the SH waves they receive is substantially the same. For the P wave is different, as in one transducer it appears first on the tail of the vector associated with it, whereas in the other transducer it appears first on the tip of the vector associated with it. It should again be considered that an oscillation appearing first on the vector tail will be transduced into a positive oscillation, whereas an oscillation appearing first on the vector tip will be transduced into a negative oscillation; consequently, one transducer will transduce the P wave with a positive sign, and the other transducer with a negative sign. The sum between both signals (P+SH) and (+P+SH) received is generated by the connection in series of the two transducers. In this way, a signal not affected by the presence of P waves is obtained, whose amplitude is substantially twice the one that would be obtained with a single transducer.

As it can be seen, therefore, also in this case a vector is associated with each transducer so that a movement in the ground in the same sense of the vector is always transformed in a potential differential between the relevant poles with a same sign, conventionally said positive, and that a movement in the ground in the opposite sense of the vector is always transformed in a potential differential between the relevant poles with a same sign, conventionally said negative, being opposite to the positive sign; according to the variant, the first output terminal of a transducer is electrically connected with the second output terminal of the other transducer, the remaining output terminals of the transducers realizing the output terminals of the geophone.

Figure 8:
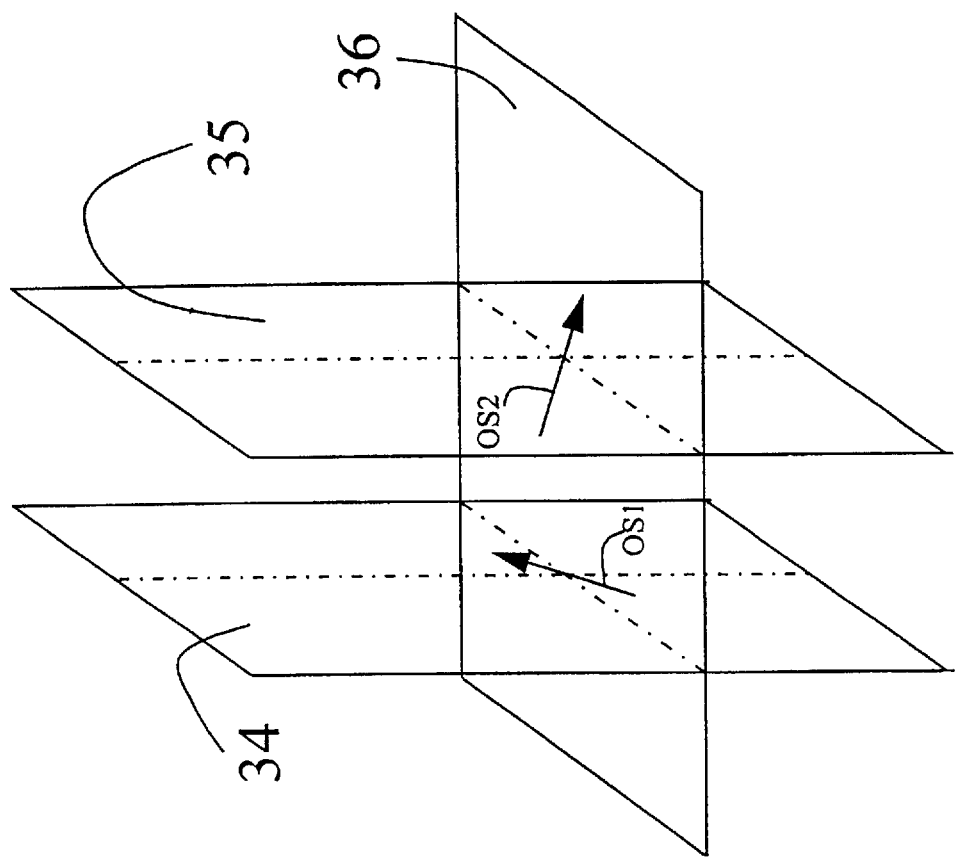
FIG. 8 shows a fourth particular geometric planes arrangement in the space, for a clear understanding of a fourth possible variant of the present invention.

FIG. 8 shows another arrangement of geometric planes in the space, for a better understanding of a possible fourth embodiment of the present invention, in such a figure, 34 and 35 indicates planes being parallel to each other and orthogonal to a plane 36.

According to the suggested variant, the geophone according to the invention may be built assembling both transducers 20 and 21 with vectors OS1 and OS2 laying on planes 34 and 35, parallel to each other and orthogonal to the plane 36, so that the vector OS1 belongs to the plane 34 and the vector OS2 to the plane 35. The two vectors OS1 and OS2 should also be so arranged so that vectors OS1 and OS2 are symmetric in direction with respect to a plane orthogonal to planes 34, 35 e 36, have the same sense (equi-sense arrangement) and amplitude or module and, laying on planes 34 and 35, form with such an orthogonal plane equal angles from 60 to 120 degrees.

Figure 9:
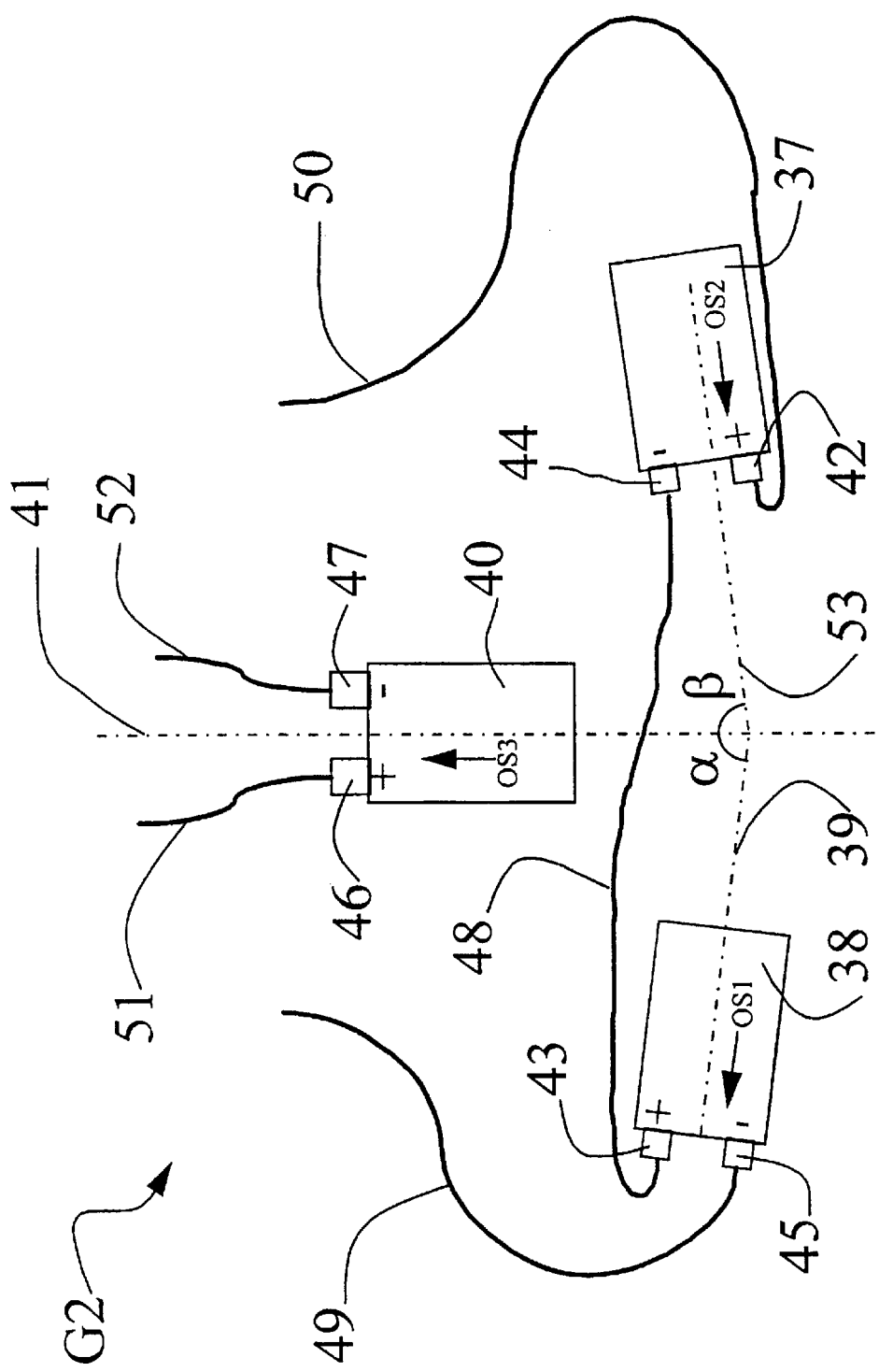
FIG. 9 shows a general diagram of a fifth possible variant of the present invention.

FIG. 9 shows another possible embodiment of the invention. In this figure G2 indicates a geophone consisting of a couple of transducers 37 and 38, and a vertical transducer 40 placed, with an associated vector OS3, parallel to a straight line 41, which is the symmetry vertical axis of the couple of transducers 37 and 38. Axis 39, 35 and 41 pertaining respectively to transducers 38, 37 and 40 lay on one same plane; also in this case, transducers 37, 38 and 40 may consist themselves of geophones made according to the known technique.

Transducers 37, 38 and 40 are provided with positive poles indicated with 42, 43 and 46, respectively, and negative poles, indicated with 44, 45 and 47, respectively.

Also in agreement with this embodiment, the poles or terminals 43 e 44 of transducers 37 and 38 are connected to each other, through electric connecting means 48, and the output signals on the end of the poles or terminals 45 and 42 of transducers 38 and 37 are brought outside the geophone G2 through output cables 49 and 50; similarly, the signals of transducers 40 are also brought outside the geophone G2 through output cables 51 and 52. In this case, therefore, the output cables are four: two cables 49 and 50 deriving from the couple of transducers 38 and 37 and the other couple of cables 51 and 52 deriving from the transducer 40. As it can be seen, if transducers 37, 38 and 40 are elastic waves transducers, this assembly allows the receipt of separate clean information of SH waves and P waves with just one energization.

It is also clear to the skilled man that the geophone G2 may be built by assembling the transducers 38 and 37 for having their associated vectors OS1 and OS2 laying on planes 34 and 35 of FIG. 8, parallel to each other and orthogonal to the plane 36 of FIG. 8, so that the vector OS1 belongs to the plane 34 of FIG. 8 and the vector OS2 to the plane 35 of FIG. 8. In the examples described above, the mechanical-electrical transducers 20, 21 and 37, 38, 40 are themselves geophones known as such: anyway, it is obvious for the skilled man that such elements may be replaced by suitable accelerometers.

What is claimed is:

1. A geophone for detecting horizontally polarized shear waves, comprising at least first and second electromechanical transducers for detecting horizontally polarized shear waves and compression waves, wherein each of said transducers has a principal axis with a corresponding vector, and comprises
a first output terminal with a first polarity,
a second output terminal with a second polarity, the second polarity being of opposite sign to the first polarity, and
sensor means responsive to movement in the ground for producing between said first output terminal and second output terminal a potential differential of one polarity when said movement is in a direction along the vector and a potential differential of polarity opposite to said one polarity when said movement is in a direction opposite to that of the vector; said transducers being in mutually spaced relationship, one of the first and second output terminals of said first transducer being directly connected to one of the first and second output terminals of said second transducer for producing between the other of said first and second terminals of said first transducer and the other of said first and second terminals of said second transducer, a signal which is more sensitive to horizontally polarized shear waves than it is to compression waves, said first and second transducers being rigidly mounted on a common support with their respective principal axes symmetric with respect to a vertical axis, the magnitude of the angle between each of said principal axes and said vertical axis being in the range of 60 to 120 degrees.

2. A geophone, according to claim 1, wherein said angle is substantially equal to 87 degrees.

3. A geophone according to claim 1 wherein the respective vectors associated with said first and second transducers are symmetric in direction and sense and have equal amplitudes.

4. A geophone according to claim 3, wherein said signal between said one terminal of said first transducer and said one terminal of said second transducer is representative of the track of a horizontally polarized shear wave.

5. A geophone according to claim 1, wherein the respective vectors associated with said first and second transducers are symmetric in direction and have the same sense and equal amplitudes.

6. A geophone according to claim 5, wherein the first output terminal of said first transducer is electrically connected to the second output terminal of said second transducer.

7. A geophone, according to claim 1, wherein said principal axes of said first and second transducers are in a common plane.

8. A geophone, according to claim 1, wherein the principal axes of said first and second transducers are in respective parallel planes.

9. A geophone, according to claim 1, further comprising a third electromechanical transducer having a first terminal with a first polarity and a second terminal with a second polarity, said second polarity being of opposite sign to the first polarity.

10. A geophone according to claim 9, wherein said third transducer has a principal axis in the same plane as the principal axes of said first and second transducers.

11. A geophone, according to claim 9, wherein said first terminal of the third transducer has a first polarity and said second terminal of the third transducer has a second polarity, representative of a compression wave.

12. A geophone, according to claim 1 further comprising means for storing signals present at said the output terminals of at least one of said first and second transducers.

13. A geophone, according to claim 1, wherein each of said transducers comprises a suspended body and a magnet, said suspended body being movable with respect to said magnet.

14. A geophone, according to claim 1 wherein each of said transducers comprises an accelerometer.

15. A geophone according to claim 1 wherein the first output terminal of said first transducer is electrically connected to the first output terminal of said second transducer.

* * * * *

UNITED STATES PATENT AND TRADEMARK OFFICE
CERTIFICATE OF CORRECTION

PATENT NO.     : 6,366,537 B1  
DATED          : April 2, 2002  
INVENTOR(S)    : Sambuelli et al.

It is certified that error appears in the above-identified patent and that said Letters Patent is hereby corrected as shown below:

<u>Title page,</u>
Item [73], Assignee, change "S.I.SV.EL., Societa Italiana per lo Sviluppo dell'Elettronica" to -- S.I.SV.EL. S.p.A., Societa Italiana per lo Sviluppo dell' Elettronica --

Signed and Sealed this

Tenth Day of September, 2002

Attest:

Attesting Officer

JAMES E. ROGAN  
*Director of the United States Patent and Trademark Office*